United States Patent
Natarajan

(10) Patent No.: US 8,213,439 B2
(45) Date of Patent: Jul. 3, 2012

(54) METHOD AND SYSTEM FOR MANAGING A NETWORK HAVING AN HSRP GROUP

(75) Inventor: Srikanth Natarajan, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2223 days.

(21) Appl. No.: 11/023,409

(22) Filed: Dec. 29, 2004

(65) Prior Publication Data

US 2005/0169284 A1    Aug. 4, 2005

Related U.S. Application Data

(60) Provisional application No. 60/540,073, filed on Jan. 30, 2004.

(51) Int. Cl.
*H04L 12/28* (2006.01)
*G06F 15/16* (2006.01)
*G06F 11/00* (2006.01)

(52) U.S. Cl. ........ 370/401; 370/217; 370/220; 370/222; 370/392; 370/402; 714/4.11; 714/5.1; 709/217; 709/238

(58) Field of Classification Search .......... 370/389–397, 370/467, 216–254, 401, 402, 486; 709/203, 709/217–242; 714/2–10
See application file for complete search history.

(56) References Cited

U.S. PATENT DOCUMENTS

| | | | | |
|---|---|---|---|---|
| 6,108,300 A * | 8/2000 | Coile et al. | | 370/217 |
| 6,109,300 A * | 8/2000 | Najmolhoda | | 137/596.16 |
| 6,272,150 B1 * | 8/2001 | Hrastar et al. | | 370/486 |
| 6,618,377 B1 * | 9/2003 | Miriyala | | 370/395.1 |
| 6,751,191 B1 * | 6/2004 | Kanekar et al. | | 370/217 |
| 6,856,591 B1 * | 2/2005 | Ma et al. | | 370/216 |
| 6,876,625 B1 * | 4/2005 | McAllister et al. | | 370/221 |
| 6,879,559 B1 * | 4/2005 | Blackmon et al. | | 370/225 |
| 6,879,562 B2 * | 4/2005 | Hoefelmeyer et al. | | 370/241 |
| 6,885,633 B1 * | 4/2005 | Mikkonen | | 370/217 |
| 6,885,667 B1 * | 4/2005 | Wilson | | 370/392 |
| 7,006,431 B1 * | 2/2006 | Kanekar et al. | | 370/217 |
| 7,042,876 B1 * | 5/2006 | Jayasenan et al. | | 370/389 |
| 7,095,747 B2 * | 8/2006 | Sarmiento et al. | | 370/401 |
| 7,117,241 B2 * | 10/2006 | Bloch et al. | | 709/201 |
| 7,136,931 B2 * | 11/2006 | Natarajan et al. | | 709/238 |
| 7,152,179 B1 * | 12/2006 | Critchfield | | 714/4.11 |
| 7,209,435 B1 * | 4/2007 | Kuo et al. | | 370/219 |
| 7,227,838 B1 * | 6/2007 | O'Riordan | | 370/219 |
| 7,227,863 B1 * | 6/2007 | Leung et al. | | 370/390 |
| 7,227,872 B1 * | 6/2007 | Biswas et al. | | 370/465 |
| 7,239,629 B1 * | 7/2007 | Olshansky et al. | | 370/353 |
| 7,280,557 B1 * | 10/2007 | Biswas et al. | | 370/465 |
| 7,308,503 B2 * | 12/2007 | Giraud et al. | | 709/230 |
| 7,486,611 B1 * | 2/2009 | Wilson | | 370/220 |
| 7,881,208 B1 * | 2/2011 | Nosella et al. | | 370/242 |

(Continued)

OTHER PUBLICATIONS

Li, et al., Cisco Hot Standby Router Protocol (HSRP), Cisco HSRP, Mar. 1998, RFC 2281, pp. 1-17.

*Primary Examiner* — Ayaz Sheikh
*Assistant Examiner* — Venkatesh Haliyur

(57) ABSTRACT

An exemplary method for monitoring status of a Hot Standby Routing Protocol group of routers includes, for each network interface of each router in the group, monitoring changes in a status of the network interface, and based on the monitored changes, determining a status of the group.

19 Claims, 12 Drawing Sheets

U.S. PATENT DOCUMENTS

| | | | |
|---|---|---|---|
| 8,001,269 B1* | 8/2011 | Satapati et al. | 709/245 |
| 2001/0048661 A1* | 12/2001 | Clear et al. | 370/218 |
| 2003/0093557 A1* | 5/2003 | Giraud et al. | 709/239 |
| 2005/0083855 A1* | 4/2005 | Natarajan et al. | 370/254 |
| 2005/0111352 A1* | 5/2005 | Ho et al. | 370/219 |
| 2005/0141499 A1* | 6/2005 | Ma et al. | 370/389 |

* cited by examiner

METHOD AND SYSTEM FOR MANAGING A NETWORK HAVING AN HSRP GROUP

RELATED APPLICATIONS

This application claims priority from U.S. Provisional Application No. 60/540,073 which was filed in the U.S. Patent and Trademark Office on 30 Jan. 2004. U.S. Provisional Application No. 60/540,073 is hereby incorporated by reference.

U.S. application Ser. No. 10/717,521 filed in the U.S. Patent and Trademark Office on 21 Nov. 2003, is directed to monitoring a network using a back-up routing protocol. U.S. application Ser. No. 10/717,521 is hereby incorporated by reference.

BACKGROUND INFORMATION

One way to achieve near-100 percent network uptime is to use Hot Standby Routing Protocol (HSRP), a proprietary protocol from Cisco that is described in IETF (Internet Engineering Task Force) document RFC (Request for Comments) 2281, dated March 1998. The term Backup Routing Protocol is used to refer to a class of backup routing protocols including HSRP.

Cisco's Hot Standby Routing Protocol (HSRP) is a protocol that is layered on top of the UDP (User Datagram Protocol) layer in the network stack. HSRP is implemented in Cisco routers or route switch modules (RSMs) to provide failover and/or load balancing for Layer 3 routing. In particular, HSRP can provide automatic router backup when it is configured on Cisco routers that run the Internet Protocol (IP) over Ethernet, Fiber Distributed Data Interface (FDDI), and Token Ring local-area networks (LANs). For IP, HSRP allows one router to automatically assume the function of a second router if the second router fails. HSRP is useful for example when the users on one subnet require continuous access to resources in the network.

Cisco's HSRP can provide a way to keep communicating when a router becomes unavailable. HSRP allows two or more HSRP-configured routers to use the MAC (Medium Access Control) address and IP network address of a virtual router. The virtual router does not physically exist; instead, it represents the common target for routers that are configured to provide backup to each other. When HSRP is configured on a router, the router automatically selects one of the virtual MAC addresses from a range of addresses in the Cisco IOS software that is within the range of Cisco's MAC address block. Ethernet and FDDI LANs use one of the preassigned MAC addresses as a virtual MAC address. Token Ring LANs use a functional address as a virtual MAC address.

HSRP also works when the hosts are configured for proxy ARP (Address Resolution Protocol). In the event an active HSRP router receives an ARP request for a host that is not on the local LAN, the router replies with the MAC address of the virtual router. If the active router becomes unavailable or its connection to the remote LAN goes down, the router that becomes the active router receives packets addressed to the virtual router and transfers them accordingly.

Multigroup HSRP (MHSRP) is an extension of HSRP that allows a single router interface to belong to more than one Hot Standby group. MHSRP uses Cisco IOS Software Release 10.3 or later and is supported on routers that have special hardware that allows them to associate an Ethernet interface with multiple unicast Media Access Control (MAC) addresses. These routers are the AGS and AGS+ routers and any router in the Cisco 7000 series. The special hardware allows a user to configure a single interface in an AGS, AGS+, or Cisco 7000 series router so that the router is the backup router for more than one Hot Standby group.

In both HSRP and MHSRP, a tracking feature can be used to adjust the Hot Standby priority of a router based on whether certain of the router's interfaces are available. A "tracked interface" is a monitored interface between a back end of a group and some port of a network, e.g. it is an interface that is not internal to the group. When a tracked interface becomes unavailable, the HSRP priority of the router is decreased, for example because unavailability of the interface makes the router less useful. Tracking can be used to automatically reduce the likelihood that a router that already has an unavailable key interface will become the active router. To configure tracking, the "standby track" interface configuration command can be used.

HSRP or MHSRP can be used when configuring load sharing. For example where Routers A, B connect to a Local Area Network (LAN) 1.0.0.0 via Ethernet interfaces 0 respectively having addresses 1.0.0.1 and 1.0.0.2, and each of the Routers A, B also connects via a different interface (for example, a serial interface) to an IP network or internetwork. In this example, the Router A is configured as an Active router for a group 1 and as a Standby router for group 2, and the Router B is configured as a Standby router for group 1 and as an Active router for group 2. Half of the workstations on the LAN are configured for Router A, and half of the workstations are configured for Router B. Together, the configuration files for Routers A and B establish two Hot Standby groups. For group 1, Router A is the default active router, and Router B is the standby router. For group 2, Router B is the default active router, and Router A is the standby router. During normal operation, the two routers share the IP traffic load. When either router becomes unavailable, the other router becomes active and assumes the packet-transfer functions of the router that is unavailable. Interface configuration commands are used so that if a router goes down and then comes back up, preemption occurs and restores load sharing.

HSRP can be used with Routed Protocols such as AppleTalk, Banyan VINES, Novell IPX, DECnet and XNS. For example, HSRP can be configured in networks that, in addition to IP, run AppleTalk, Banyan VINES, and Novell IPX. AppleTalk and Novell IPX continue to function when the standby router becomes the active router, but they take time to adapt to topology changes.

In summary, HSRP and MHSRP use fault-tolerant routing of IP packets for networks in an effort to provide nonstop access by hosts on all segments to resources on all segments. To provide fault tolerance, HSRP and MHSRP use a routing protocol that converges rapidly, such as Enhanced Interior Gateway Routing Protocol (Enhanced IGRP).

SUMMARY

In an exemplary embodiment, a method for monitoring status of a Hot Standby Routing Protocol group of routers includes, for each network interface of each router in the group, monitoring changes in a status of the network interface, and based on the monitored changes, determining a status of the group.

In an exemplary embodiment, a method for monitoring status of a Hot Standby Routing Protocol group of routers, includes receiving an object identification of a router interface which has undergone a status change, receiving a Hot Standby Routing Protocol object in the event the router interface belongs to a Hot Standby Routing Protocol group, determining all other interfaces of routers in the Hot Standby Routing Protocol group, polling determined router interfaces to determine a status and Hot Standby Routing Protocol priority of each interface, and determining an active interface based on the polling.

In an exemplary embodiment, a method for monitoring status of a Hot Standby Routing Protocol group of routers, includes detecting a state transition of an interface, determining whether the interface belongs to a Hot Standby Routing Protocol group, based on the determining, identifying all Hot Standby Routing Protocol interfaces for the Hot Standby Routing Group to which the interface belongs, polling the identified interfaces for status information, and determining Hot Standby Routing Protocol group status and active and standby interfaces based on the polling.

An exemplary system for monitoring status of a Hot Standby Routing Protocol group of routers, includes a mechanism for monitoring changes in a status of each network interface of each router in the group and determining a status of the group based on the monitored changes, and a mechanism for displaying the determined status.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements

DETAILED DESCRIPTION

Figure 1:
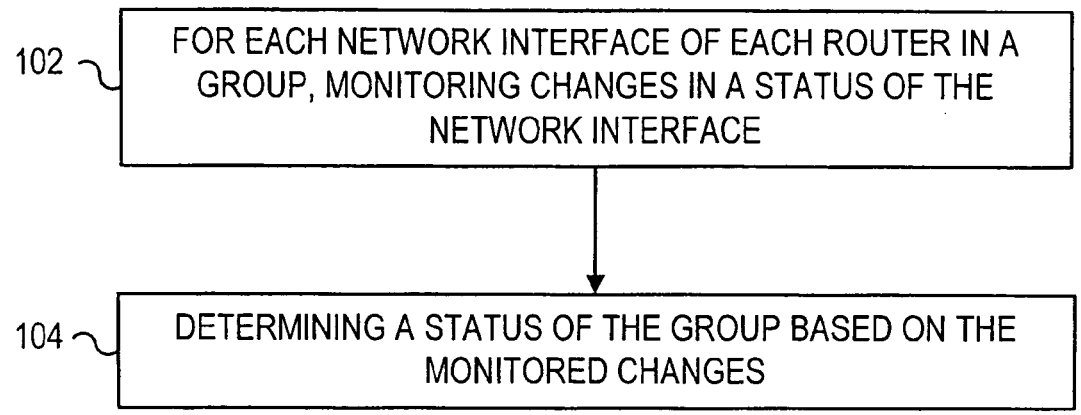
FIG. 1 illustrates a first exemplary method.
Figure 2:
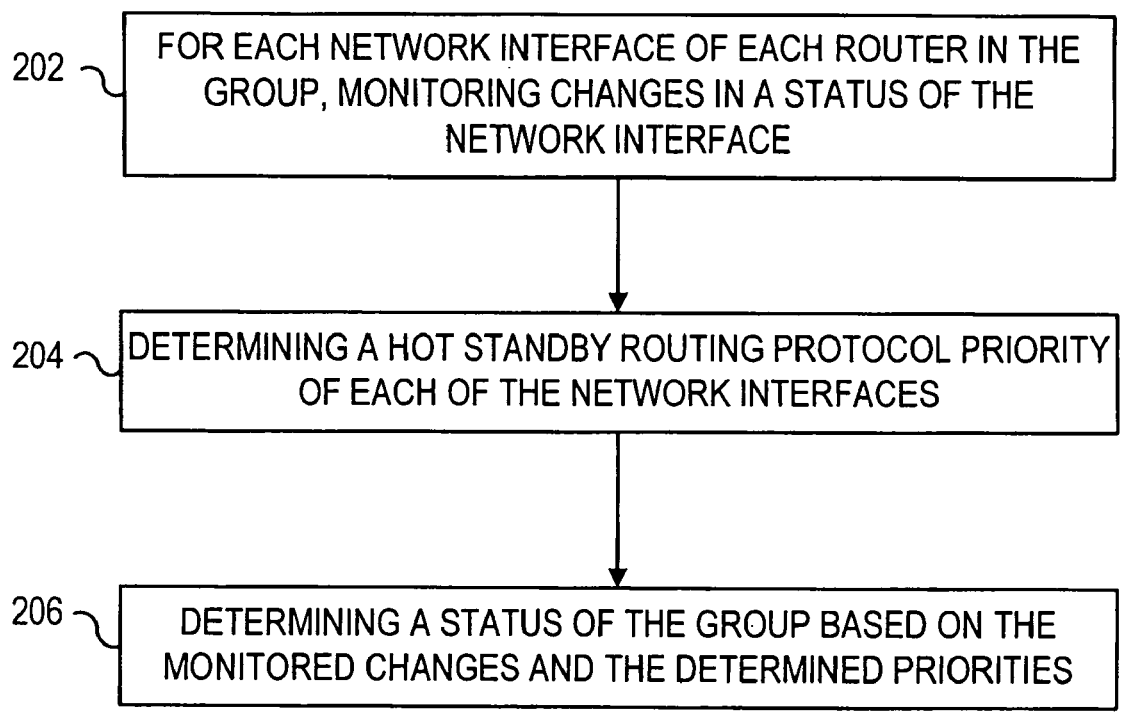
FIG. 2 illustrates a second exemplary method.

FIG. 1 illustrates an exemplary method for monitoring status of a Hot Standby Routing Protocol group of routers, wherein in a first block 102, for each network interface of each router in the group, changes in a status of the network interface are monitored. In a next step 104, a status of the group is determined based on the monitored changes. HSRP group status information can include, for example, FIG. 2 illustrates another exemplary method, wherein in a first block 202, for each network interface of each router in the group, changes in a status of the network interface are monitored. In a next step 204, a Hot Standby Routing Protocol priority of each of the network interfaces is determined. In a next step 206, a status of the group is determined based on the monitored changes and the determined priorities.

Figure 3:
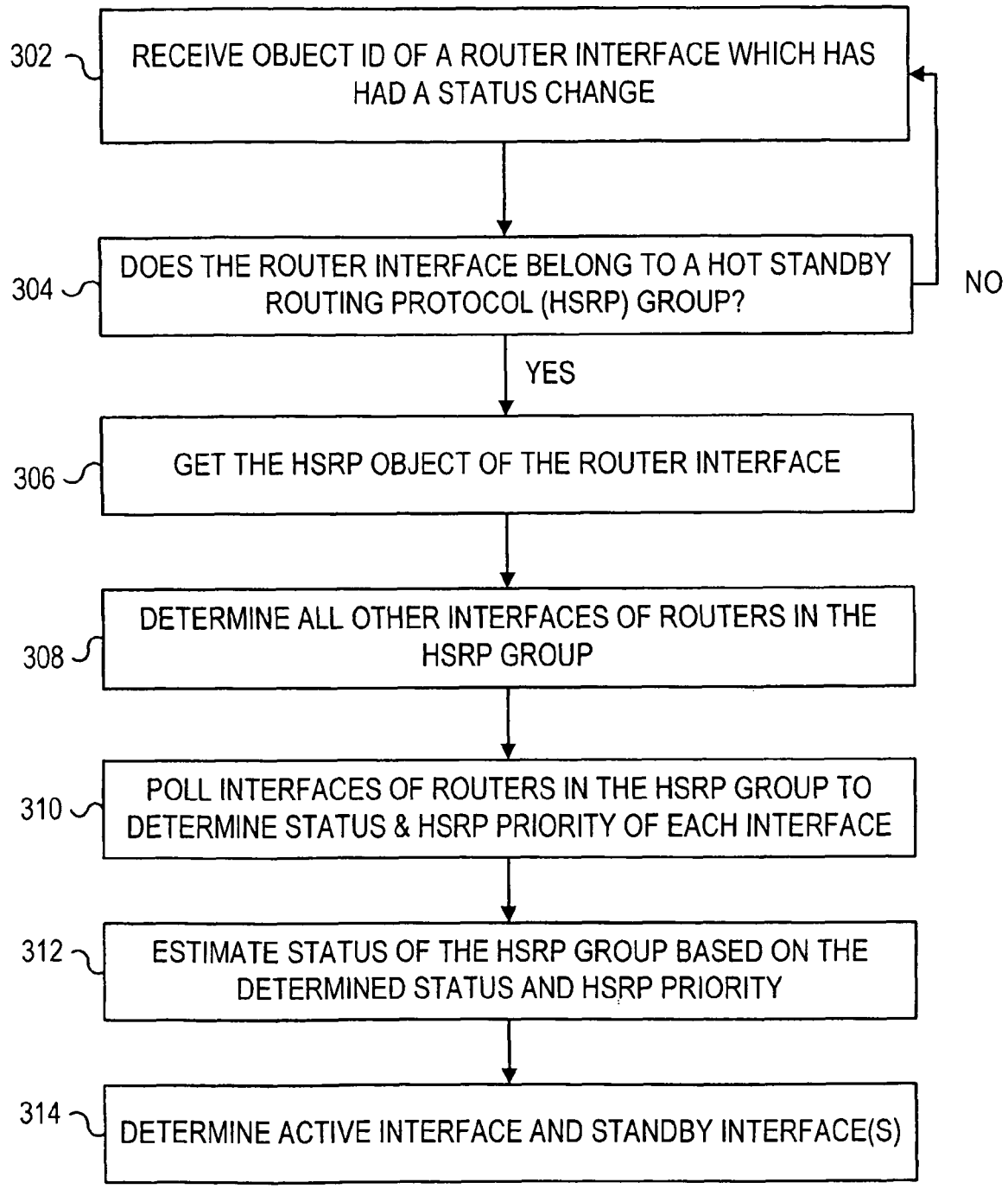
FIG. 3 illustrates a third exemplary method.

FIG. 3 illustrates another exemplary method, wherein in a first block 302, an object id of a router interface which has had a status change is received. In a next step 304, a determination is made, whether the router interface belongs to a hot standby routing protocol (hsrp) group. If no, then control returns to block 302. If yes, then control proceeds to block 306, wherein the HSRP object of the router interface is obtained. From block 306, control proceeds to block 308, wherein all other interfaces of routers in the HSRP group are determined. From block 308, control proceeds to block 310, wherein interfaces of routers in the HSRP group are polled to determine status & HSRP priority of each interface. From block 310, control proceeds to block 312 wherein status of the HSRP group is estimated based on the determined status and determined HSRP priority. From block 312, control proceeds to block 314, wherein it is determined which interface is the active interface and which interfaces are standby interfaces.

Figure 7A:
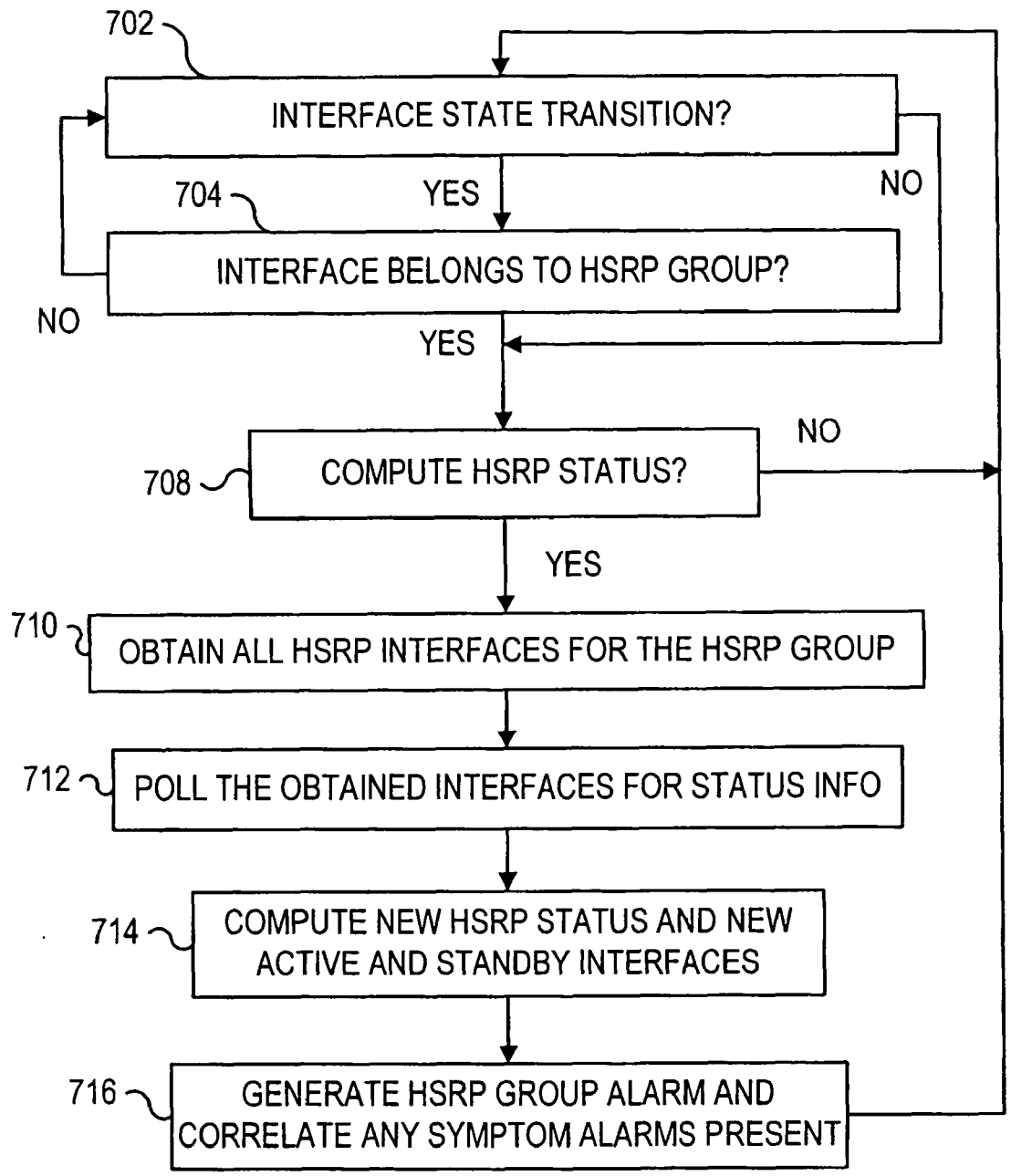
FIGS. 7A-7C illustrates exemplary methods.
Figure 7B:
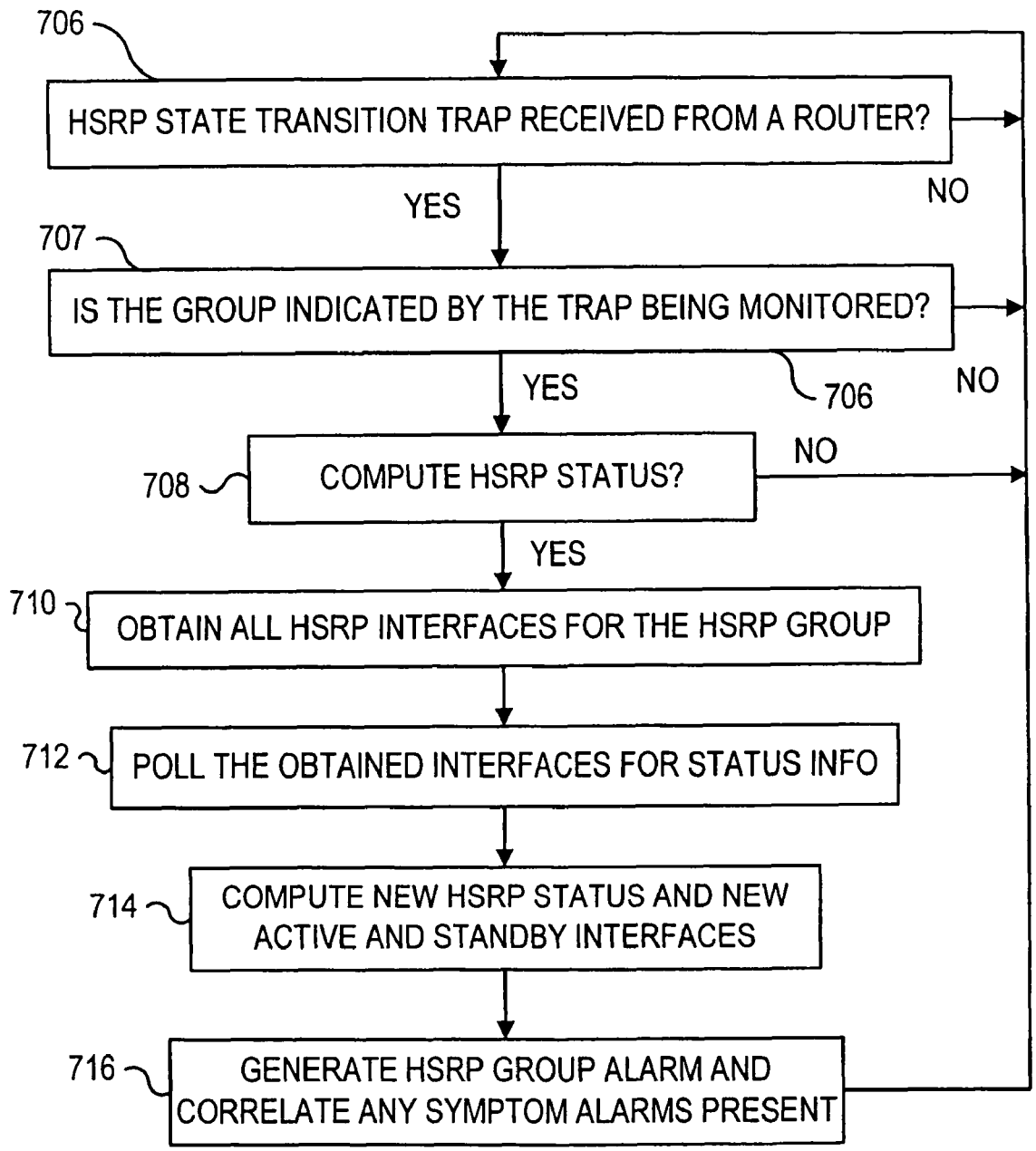
Figure 7C:
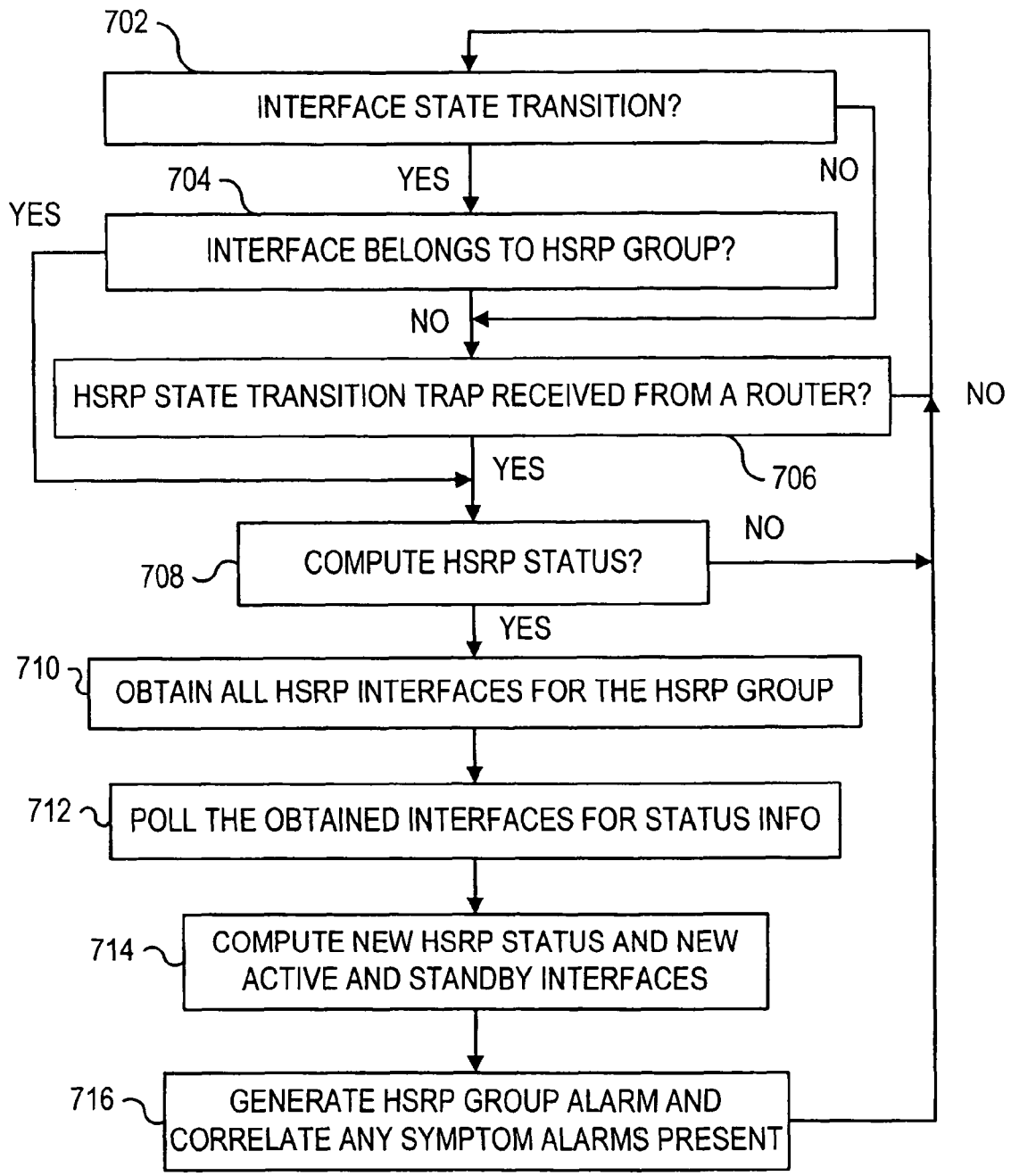

Exemplary methods shown in the figures can be implemented using, for example, an algorithm having two paths shown in FIG. 7C. FIGS. 7A, 7B show the paths separately, the paths can execute concurrently, and independently or asynchronously. In a first path, determination or calculation of the HSRP group status is triggered by an interface state transition, for example a signal indicating an interface state transition. In the second path, determination or calculation of the HSRP group status can be triggered by an HSRP state transition trap, that is for example received by a system or software program such as Hewlett Packard Company's Network Node Manager (NNM), that is monitoring the network in question. The trap can be for example a Simple Network Management Protocol (SNMP) trap.

In particular, in a first block 702 shown in FIG. 7C, a determination is made whether an interface state transition has occurred. An interface state transition can, for example, be perceived or announced by a signal reported to a monitoring mechanism such as NNM. The signal can indicate, for example, whether an interface now has a status of up, down, or unknown. If the determination in block 702 is no, then control proceeds to block 706. If the determination is yes, then control proceeds to block 704, wherein a determination is made whether the interface that changed state is a member of an HSRP group. This determination can be made, for example, by the monitoring mechanism referring to a table or listing of members of one or more HSRP groups that the monitoring mechanism monitors.

If the determination in block 704 is yes, then control proceeds to block 708. If the determination in block 704 is no, then control proceeds from block 704 to block 706, where a determination is made, whether an HSRP state transition trap has been received from a router. If the determination in block 706 is no, then control returns to block 702. If the determination in block 706 is yes, then control proceeds from block 706 to block 708.

In block 708, a decision is made whether to compute HSRP status. This decision can be made, for example, by determining whether another analysis is already in progress for the group in question. If another analysis is already in progress, then the decision can be to not (re-)computer the HSRP status. For example, in an exemplary embodiment if an HSRP trap comes first, the HSRP status calculation/determination process may begin. If during the course of this process an interface status change event arises or comes to light, for example from a polling process, then a decision at block 708 can be made to not (re-)compute HSRP status, since the computation is ongoing. In this situation, an alarm for the interface status change can be correlated under, or with, the HSRP group alarm.

If the decision in block 708 is no, then control returns to block 702. If the decision in block 708 is yes, then control proceeds from block 708 to block 710 where all HSRP interfaces belonging to the HSRP group are obtained, and from block 710 control proceeds to block 712 where the interfaces belonging to the HSRP group (or at least the interfaces for which current information is not known or verified) are polled. From block 712 control proceeds to block 714, where the HSRP status is calculated or determined anew, for example based on the information provided by the interfaces in response to the poll. The new active interface and standby interface(s) can also be determined at this stage, as shown in block 714. From block 714, control proceeds to block 716, wherein an HSRP group alarm is generated, and any symptom alarms that are present, are correlated. For example, alarm symptoms such as an HSRP trap alarm, and an interface state transition alarm. From block 716, control returns to block 702.

If the determination in block 704 is no, then control proceeds to block 706 where a determination is made whether an HSRP state transition trap has been received, for example from a router. If the determination is no, then control returns block 702, but if the determination is yes then control proceeds to block 708, where a determination is made whether to compute or determine the HSRP group status. If the determination in block 708 is yes, then control proceeds to block 710, and the HSRP group status is discerned as described with respect to blocks 710-714. If the determination in block 708 is no, then control returns to block 702.

FIG. 7A is similar to FIG. 7C, except that block 706 is omitted, and a negative determination in block 704 causes control to return to block 702. FIG. 7B is similar to FIG. 7C, except that blocks 702 and 704 are omitted, so that negative determinations in any of blocks 706, 707, and 708 return control to block 706, and control returns from block 716 to block 706. In addition, block 707 is added between blocks 706 and 708. If the determination in block 706 is yes, then control proceeds from block 706 to block 707, where a determination is made, whether the group indicated by the trap is being monitored. If yes, then control proceeds to block 708, if no then control returns from block 707 to block 706. Intermediate and/or final results of the processes described in FIGS. 7A-7C, for example computed HSRP status, interface priority, (active, standby, etc.), information received from polling interfaces, generated HSRP group alarm(s) and results of correlating symptom alarms, can be displayed, for example via a screen of the computer 40, and can be recorded, archived, transmitted, and so forth.

In an exemplary method, rules in the table below can be used to compute HSRP group or group object status, as well discern active and standby router interfaces.

TABLE 1

| Status No. | Interface Status Condition | HSRP Group Object Status | Active/Standby Interface Computation |
|---|---|---|---|
| 1 | All interfaces Normal | Normal | Interface with highest priority for the group is the Active, interface with the next highest priority for the group is the Standby |
| 2 | All interfaces Critical | Critical | No Active or Standby interfaces |
| 3 | All interfaces Unknown | Unknown | Interface with highest priority for the group is the Active, interface with the next highest priority for the group is the Standby, but mark these indicates as "Uncertain" |

TABLE 1-continued

| Status No. | Interface Status Condition | HSRP Group Object Status | Active/Standby Interface Computation |
|---|---|---|---|
| 4 | Interfaces in either Critical or Normal status only, with at least one in each status category | Warning | Among the interfaces having Normal status, the one having highest priority is Active, the one having next highest priority is Standby |
| 5 | Interfaces in either Unknown or Normal status only, with at least one in each status category | Minor/Marginal (There may or may not be a problem with the unknown interfaces) | Interface with highest priority for the group is the Active, interface with the next highest priority for the group is the Standby, but mark these as "Uncertain" |
| 6 | Interfaces in either Critical or Unknown status only, with at least one in each status category | Major | Among the interfaces having Unknown status, the one having highest priority is Active, the one having next highest priority is Standby, but mark these as "Uncertain |
| 7 | At least one interface in each status category of Normal, Critical and Unknown | Warning | Among the interfaces having either Normal or Unknown status, the one having highest priority is Active, the one having next highest priority is Standby, but mark these as "Uncertain |

Figure 4:
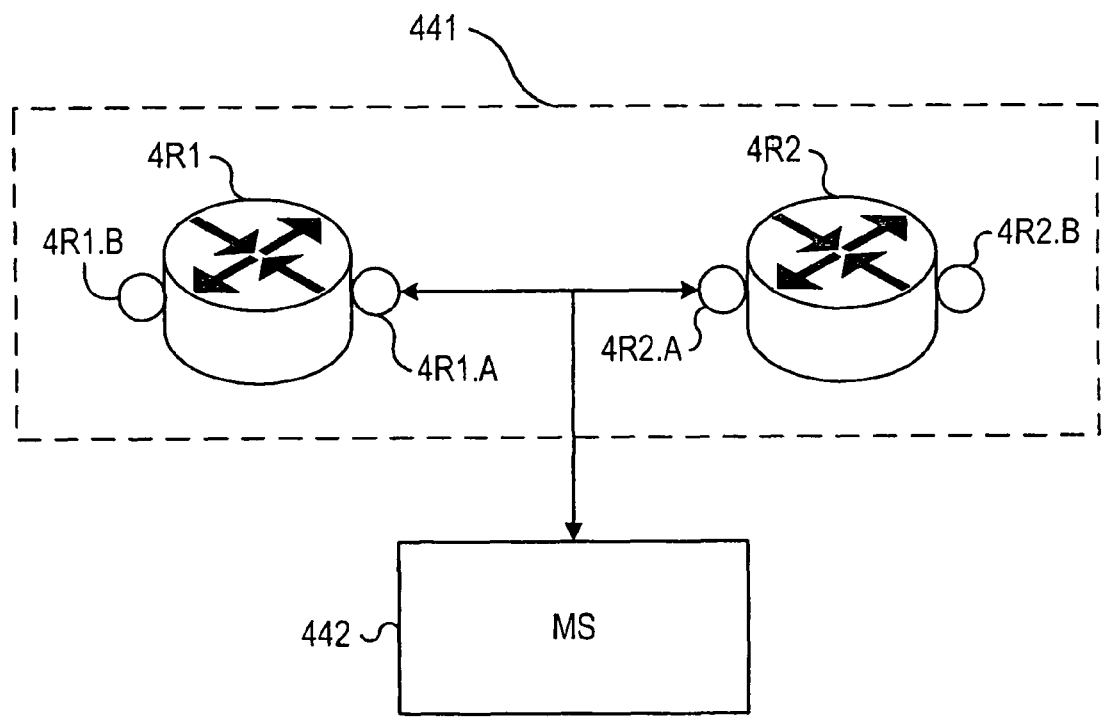
FIG. 4 illustrates a first router configuration.
Figure 5:
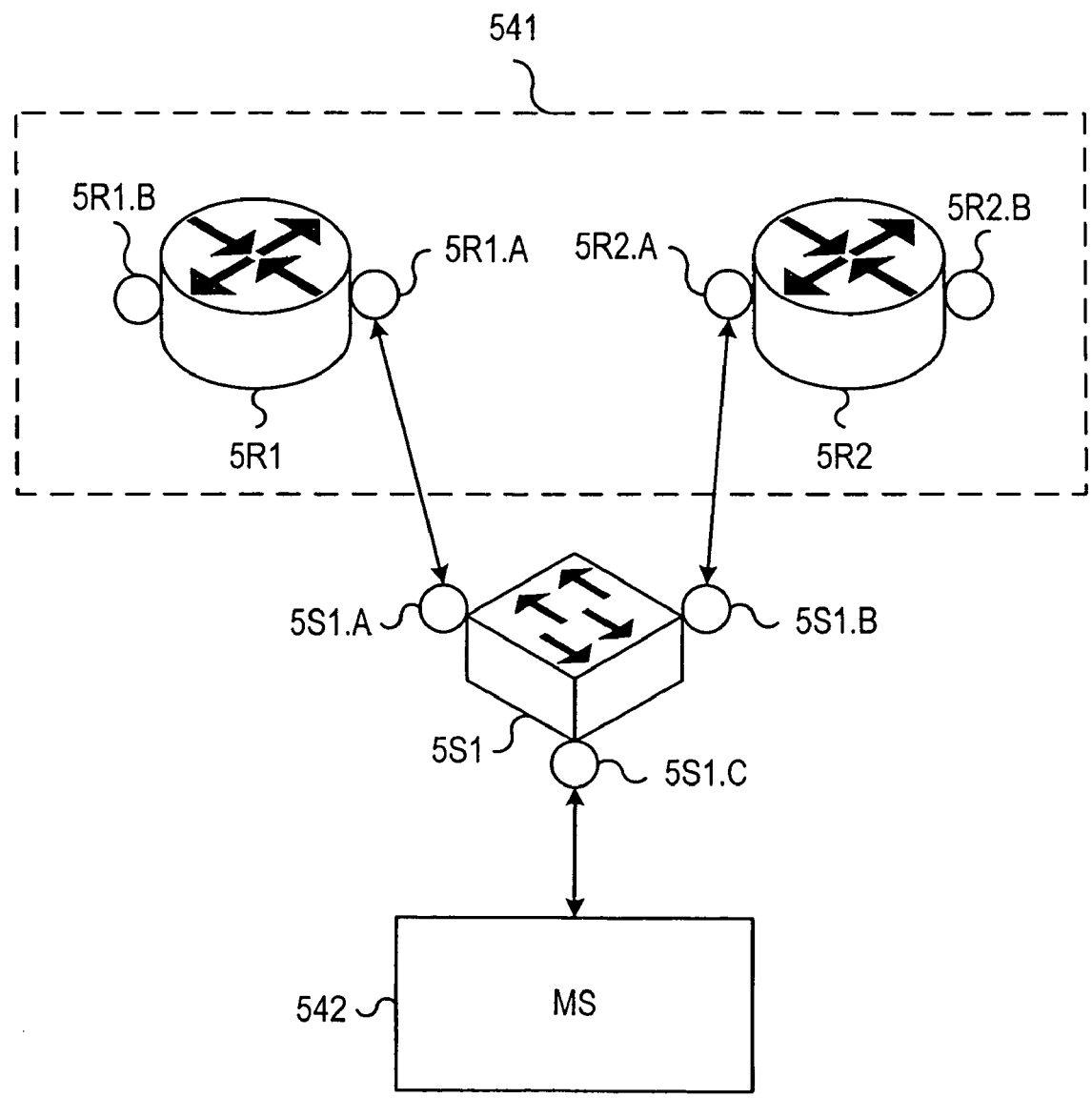
FIG. 5 illustrates a second router configuration.
Figure 6:
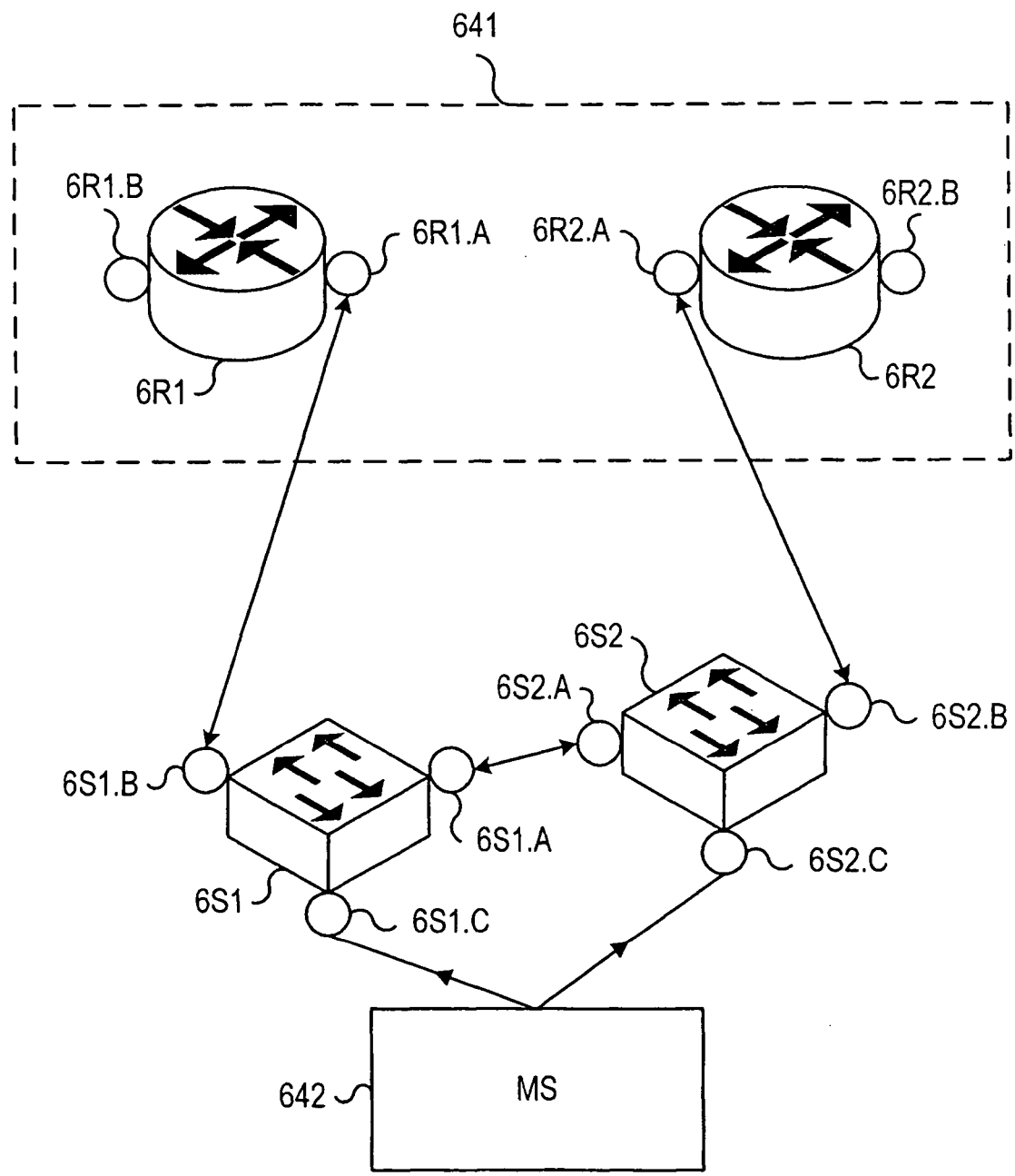
FIG. 6 illustrates a second router configuration.

FIGS. 4-6 illustrate different configurations and scenarios where the exemplary methods described herein can be applied.

FIG. 4 illustrates a configuration where two failover scenarios can occur. As shown in FIG. 4, the configuration includes a first router 4R1 having an interface 4R1.B and an interface 4R1.A that is connected to an MS 442 and an interface 4R2.A of a second router 4R2. The second router 4R2 has a second interface 4R2.B. The two routers belong to the same HSRP group 441. The HSRP enabled router interfaces 4R1.A, 4R2.A are in the same LAN (Local Area Network) segment, or are connected point-to-point without any intervening devices between them (as shown in FIG. 4). There can be a network between the routers 4R1, 4R2 and the MS 442.

The first scenario begins with the interface 4R2.A as the Active interface, and the interface 4R1.A as the Standby interface. When 4R2.A fails, 4R1.A will become the Active, and there will be no Standby. In this event the network monitor generates (or causes generation of) a signal or alert that indicates the interface 4R2.A has gone down. The router 4R1 can also generate an HSRP State transition trap, for example to indicate that 4R1.A has transitioned from a Standby interface to an Active interface.

In a second failover scenario with respect to FIG. 4, initially the interface 4R2.A is the Active interface, 4R1.A is the Standby interface, and 4R2.A tracks 4R2.B. When 4R2.B fails, 4R2.A lowers its own priority and forces 4R1.A to become the Active interface. In this event the network monitor generates (or causes generation of) a signal or alert that indicates the interface 4R2.B has gone down. The router 4R1 can also generate an HSRP State transition trap, for example to indicate that 4R1.A has transitioned from a Standby interface to an Active interface.

FIG. 5 illustrates another configuration where two failover scenarios can occur. As shown in FIG. 5, the configuration includes a first router 5R1 having an interface 5R1.B and an interface 5R1.A that is connected to a switch 5S1 via a switch interface 5S1.A. A second interface 5R2 has an interface 5R2.B and an interface 5R2.A that is connected to the switch 5S1 via a switch interface 5S1.B. The switch 5S1 is connected via an interface 5S1.C to an MS 542. The two routers 5R1, 5R2 belong to the same HSRP group 541. The HSRP enabled router interfaces 5R1.A, 5R2.A are in the broadcast domain, and are physically connected via the switch 5S1. There can be a network between the switch 5S1 and the MS 542.

In the first scenario, initially 5R2.A is the Active interface and 5R1.A is the Standby interface. If either 5S1.B or 5R2.A fails, then HSRP failover will occur and 5R1.A will become the Active interface. In this event the network monitor generates (or causes generation of) a signal or alert that indicates the status of the interface 5R2.A is unknown. The network monitor will also generate (or cause generation of) a signal or alert that indicates the interface 5S1.B has gone down. The router 5R1 can also generate an HSRP State transition trap, for example to indicate that 5R1.A has transitioned from a Standby state to an Active state.

In the second scenario, initially 5R2.A is the Active interface and 5R1.A is the Standby interface. If 5S1.C fails, the HSRP will not be impacted or affected. However, the network monitor will generate (or cause generation of) a signal or alert indicating that the status of the interface 5R2.A is unknown, and will also generate a signal or alert indicating that the interface 5S1.C has gone down.

FIG. 6 illustrates another configuration where a failover scenario can occur. As shown in FIG. 6, the configuration includes a first router 6R1 having an interface 6R1.B and an interface 6R1.A that is connected to a switch 6S1 via a switch interface 6S1.B. A second interface 6R2 has an interface 6R2.B and an interface 6R2.A that is connected to a switch 6S2 via a switch interface 6S2.B. The switch 6S1 has an interface 6S1.A, and the switch 6S2 has an interface 6S2A that connects to the interface 6S1.A to connect the two switches 6S1, 6S2. The switches 6S1 and 6S2 are also respectively equipped with interfaces 6S1.C and 6S2.C, that each provide two-way connections to an MS 642. The HSRP enabled router interfaces 6R1.A, 6R2.A are in the same broadcast domain, and are physically connected via the two switches 6S1, 6S2. There can be a network between the two switches 6S1, 6S2 and the MS 642.

In the failover scenario, initially 6R2.A is the Active interface, and 6R1.A is the Standby interface. If 6S1.A and/or 6S2.A fails, the HSRP will be negatively affected or impacted—both 6R1.A and 6R2.A may become active simultaneously. The network monitor will generate (or cause generation of) a signal or alert indicating that the interfaces 6S1.A and/or 6S2.A have gone down.

In an exemplary implementation involving Hewlett Packard Company's Network Node Manager (NNM), some new events can be created under the Status Alarms category in NNM, for informing a user about HSRP group status change conditions. Possible events can include for example:

HSRPDown
HSRPUnknown
HSRPMajor
HSRPWarning
HSRPNormal
HSRPStateTransition
HSRPTrackedStateTransition (Opportunistic)

These events can be sent out by a Composer element or module of NNM, based on status changes reported by a loaded shared library. Exemplary details of HSRP group status computation are documented in Table 1.

Figure 8:
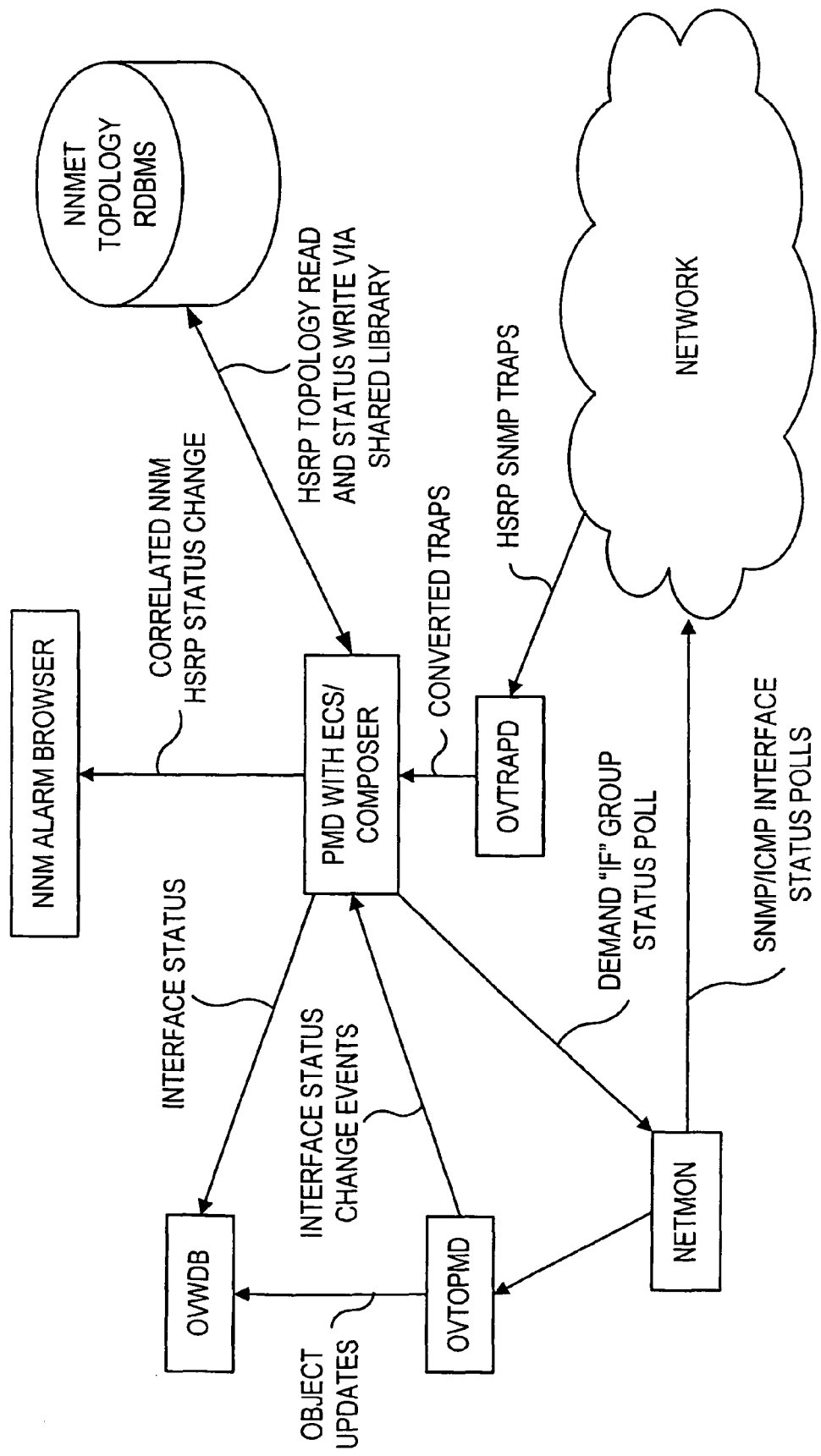
FIG. 8 illustrates an exemplary implementation involving Hewlett Packard Company's Network Node Manager (NNM).

FIG. 8 illustrates an exemplary implementation involving Hewlett Packard Company's Network Node Manager (NNM), wherein a network provides HSRP SNMP traps to an OVTRAPD module, which in turn provides converted traps to a PMD with ECS/Composer module. The PMD with ECS/Composer module also receives/exchanges HSRP topology read and status write via a shared library, stored for example in an NNMET Topology RDBMS. The PMD with ECS/Composer module also receives interface status change events from a module OVTOPMD, and provides a) interface status to a module OVWDB, b) correlated NNM HSRP status change to an NNM Alarm Browser module, and c) an IF Group status poll Demand to a module Netmon. The Netmon module communicates with the OVTOPMD module, which in turn communicates Object updates to the OVWDB module.

Figure 9:
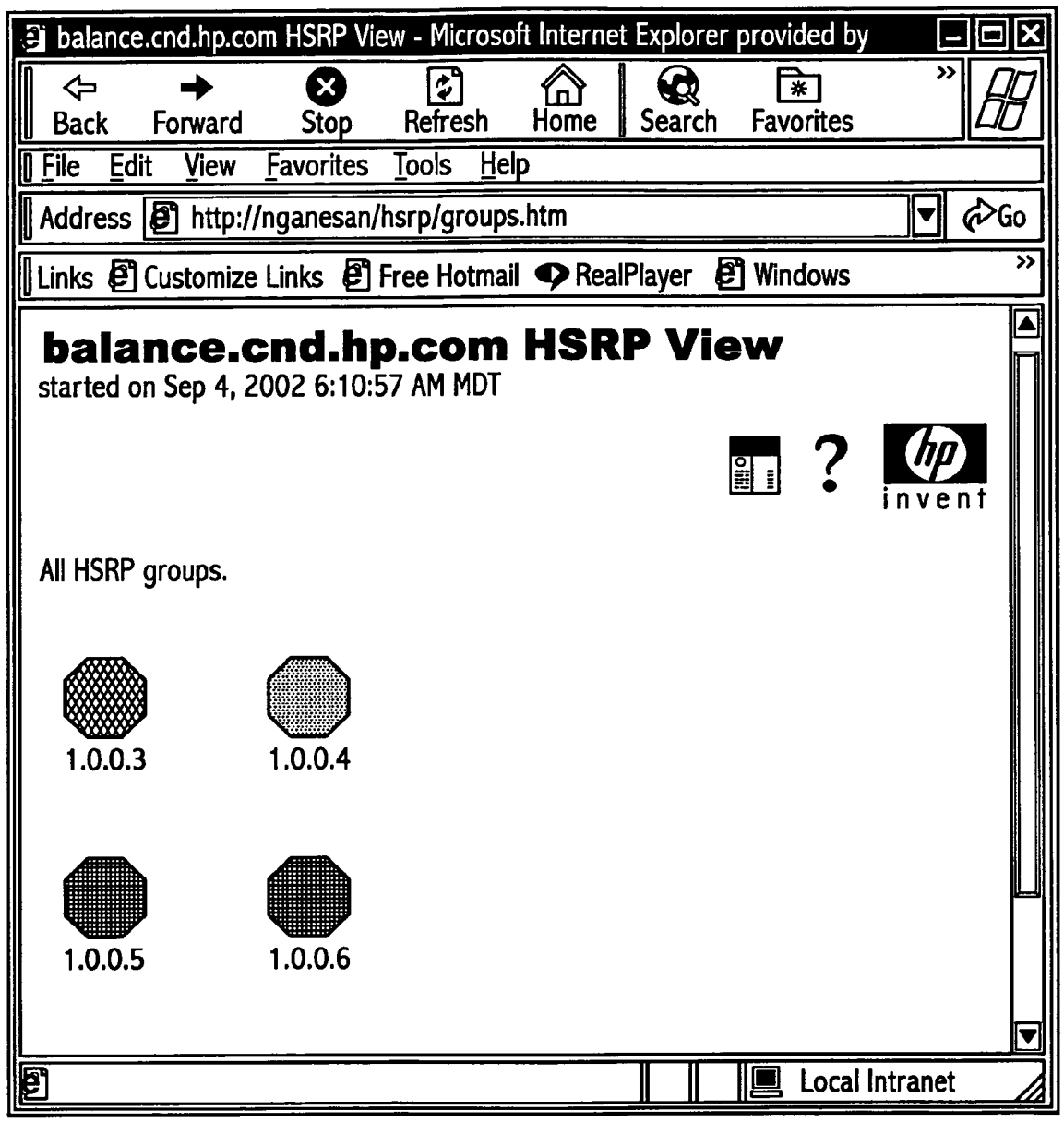
FIG. 9 shows a first exemplary view in a graphical user interface.
Figure 10:
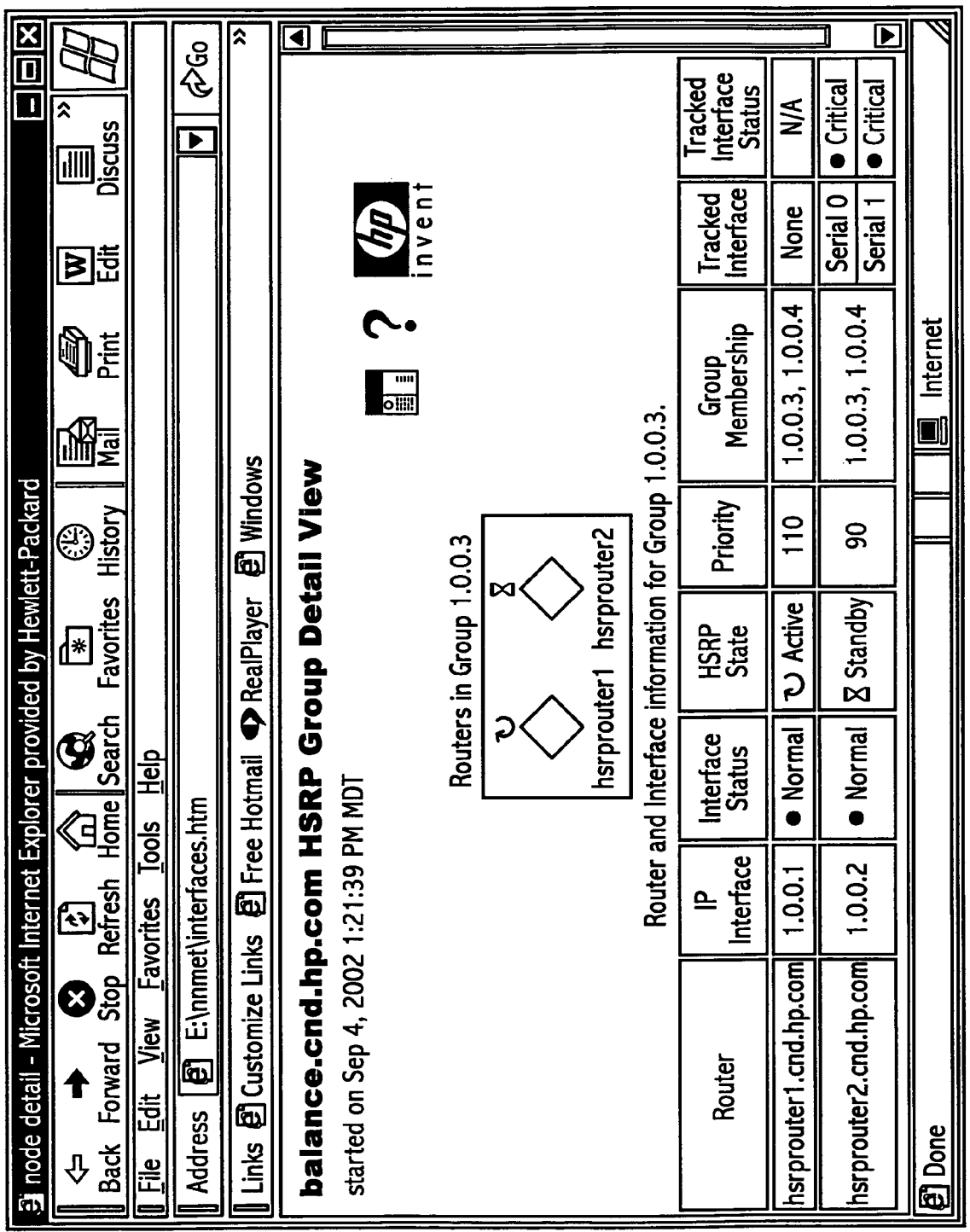
FIG. 10 shows a second exemplary view in a graphical user interface.

A graphical user interface can be provided, from which a user can select a view that shows all the HSRP groups, as for example the view in FIG. 9 which shows four HSRP groups. The user can also select one of the HSRP groups for a closer view, an example of which is shown in FIG. 10.

Some rules can be introduced or implemented in the Composer to support such functions, including rules to process OV_IF events and HSRP traps and to trigger the status monitoring of HSRP objects. The rules can also have or use a parameter to configure a wait time for Netmon polls to finish.

With respect to the shared library for ECS/Composer to use when making HSRP topology or status related calls, the shared library can contain methods to compute HSRP object status changes, HSRP topology changes, and various utility routines. The ECS Composer circuit can use the library via a callout mechanism. The callout mechanism can be implemented in PMD via a dynamic loading mechanism.

Below are the approximate descriptions of various interfaces (illustrated in the "C" programming language) that can be provided to support Composer to query topology details. The final interfaces used by the Composer rules can have a normalized signature.

A first method "int inittopology(const int reinit)" can perform initializations such as connecting to NNM OVWDB and NNMET topology service, and can create local HSRP state data structures.

int initTopology(const int reinit)
Input
reinit—This parameter indicates whether there needs to be a reinit or not. The value of 1 should be used when the shared library needs to be reinitialized when the NNMET topology is recreated.
Output
None
Return value
1 on Success and 0 on Failure.

Another method "int isInterfaceLocal(const int interfaceNNMobjecId)" can determine if an interface is locally managed or remotely managed by a collection station.

int isInterfaceLocal(const int interfaceNNMobjecId)
Input:
InterfaceNNMobjectId: The NNMObjectId of the interface Output
None
Return value
1 if the answer is yes else 0

Another method "int isHSRPInterface(const int interfaceNNMobjecId, char*virtuallPaddress)" determines if an interface supports HSRP.

int isHSRPInterface(const int interfaceNNMobjecId, char*virtuallPaddress)

Input interfaceNNMobjecId: The NNM object ID of the interface

Output virtuallPaddress: Virtual IP address of the HSRP group to which the interface belongs. NULL if the interface does not support HSRP.

Return value:

1 if the answer is yes else 0

Another method "int isHSRPGroupBeingProcessed (const char*hsrpTrapSourceAddress)" determines whether an HSRP group is being processed currently or not.

int isHSRPGroupBeingProcessed (const char*hsrpTrapSourceAddress)

Input hsrpTrapSourceAddress: The IP address that came with the HSRP trap (TBD from where in the trap)

Return value 1 if the answer is yes else 0

Another method "int isHSRPGroupBeingProcessed (const int interfaceNNMobjecId)" is the same method as "int isHSRPGroupBeingProcessed (const char*hsrpTrapSourceAddress)" above but with a different input parameter.

int isHSRPGroupBeingProcessed (const int interfaceNNMobjecId)

Input:

interfaceNNMobjectId: The NNM object ID of the interface.

Return value 1 if the answer is yes else 0

Another method "int*getHSRPGroupInterfaces(const char*hsrpTrapSourceAddress)" returns a list of interfaces belonging to an HSRP group.

int*getHSRPGroupInterfaces(const char*hsrpTrapSourceAddress)

Input hsrpTrapSourceAddress: The IP address contained in the trap (TBD: which varbind in the trap)

Return value

A list of NNM Object Ids of the interfaces in the group

A method "int*getHSRPGroupInterfaces(const int interfaceNNMObjectId)" is the same as the method "int*getHSRPGroupInterfaces(const char*hsrpTrapSourceAddress)" above, but with a different input.

int*getHSRPGroupInterfaces(const int interfaceNNMObjectId)

Input interfaceNNMObjectID: The NNM object ID of the interface

Return value

A list of NNM Object Ids of the interfaces in the group

A method "int*getOtherHSRPGroupInterfaces(const int interfaceNNMObjectId)" returns interfaces in a group other than the one passed in.

int*getOtherHSRPGroupInterfaces(const int interfaceNNMObjectId)

Input interfaceNNMObjectID—The NNM object ID of the interface

Return value

A list of NNM Object Ids of the interfaces in the group other than the one passed A method "void checkAndComputeHSRPStatus( . . . )" can compute the new state of an HSRP container object, and compare it with the old state. It the old and new state differ it will report so, and also give the new state. This method will also compute the active and the standby interfaces for the group, and if there is a change, it will report the change. If there is no HSRP status change, and only an HSRP state transition, then this method will detect that, and report that as well. Before this method returns to ECS, if there is any change in the group status or state, it will update the NNMET topology database with the changed values using the NNMET topology API.

void checkAndComputeHSRPStatus(const int interfaceNMObjectId, int

*statuschange, int*stateTransition, int*newStatus, char*newActiveAddress, int

*newActiveObjectId, char*newStandbyAddress, int*newStandbyObjectId)

Input interfaceNNMObjectId

Output statusChange: Indicates whether the HSRP object status changed or not stateTransition: Indicates whether a state transition occurred, i.e., any changes to the current active, standby interfaces newStatus: The new status of the HSRP object if there was a change else NULL newActiveAddress: The IP address of the new active interface if any, NULL otherwise newStandbyAddress: The IP address of the new standby interface if any, NULL otherwise. Note that there may be a new active but there may not be a new standby.

newActiveObjectId: The NNM Object Id of the new active address if any newStandbyObjectId: The NNM Object Id of the new standby address if any Return value None An equivalent API (Application Program Interface) with hsrpTrapSourceAddress can also be introduced so that Composer can compute HSRP object status from a trap address.

Table 1 shows the rules for computing HSRP object status as well for computing active and standby router interfaces. Composer can use these values and generate events with appropriate severity and data in them.

Here is an example of event generation: if there were mere state transition but no HSRP group status change, the HSRPStateTransition event would be emitted with the new active, standby interface details being populated in the event by the Composer. In exemplary embodiments, the Composer can generate an event on every HSRP group status change.

With respect to Netmon changes for interfaces group status polling, Netmon can support the demand poll mechanism via a NNM event interface. In an exemplary embodiment, Netmon receives the OV_Force_Polling, and OV_Force_Status_Only_Polling events from applications that need Netmon to perform a demand poll. This mechanism expects the requesting application to listen on a socket for the response from Netmon, and can also work at the node level. A new mechanism can be added in Netmon to support a demand status poll request for a group of interfaces. This enables ECS to ask Netmon to demand poll since ECS can easily send an event to other applications. This mechanism can be implemented via an NNM event interface. When Netmon receives such an event, Netmon can respond by scheduling status polls for interfaces with a timestamp of 'now' if the interfaces are not being polled already. Note that 'now' may not mean result in immediate performance if Netmon's polling queue is backed up. The interfaces can be added to a pinglist in Netmon with a timestamp of 'now'. Only those interfaces that are managed will be scheduled.

Netmon changes for interfaces group polling can be achieved by introducing a new internal OV event named "V_Force_If_Group_Status_Poll". This event can carry NNM object identifications (IDs) of the interfaces to be polled, as well as all mandatory varbinds. Consider for example the following varbinds:

Varbind number 5: The name of an HSRP group name.

Varbind 6: A comma separated list of the NNM object IDs of all the interfaces that are to be status polled.

For example, varbinds 5, 6 in an event may look like:

TABLE 2

| HSRP_15.2.132.1 | 100, 1007, 200 |
| --- | --- |

This will mean that interfaces in the HSRP group 15.2.132.1 are to be polled, and their NNM object Ids are 1001, 1007, and 200.

With respect to details of the interactions between various components, note first that the term "Composer" is used herein to mean a Composer circuit and not a Composer UI (User Interface). Assumptions include the following:

1. Composer rules have been configured specifically for this correlation out of the box, and will not be removed by the user.

2. A shared library with lots of dependencies on NNM and NNMET libraries will be dynamically be loadable by Composer. This shared library will have some C and some C++ code in it and will be compiled using a supported C++ compiler for NetComplete II.

3. During one correlation Logical Unit of Work (LUW), Composer can call different routines in the shared library at different times.

The interaction between Composer and the shared library is referred to as "Composer asks callout", and "callout responds with". The shared library method that Composer can use for a particular request will not be detailed here, those skilled in the art can infer it from the list of C interfaces mentioned above.

A more detailed interaction design will now be described, first with respect to HSRP Correlation/Status Change, and then with respect to NNMET Topology Reinitialization.

In an HSRP Correlation/Status Change, action begins when a PMD is received, for example either an OV_IF_Down or OV_IF_Up, or an OV_IF_Unknown from OVTOPMD, or an HSRPStateChange trap is received from the network. PMD forwards the event to the Composer circuit, which performs the following:

If the event is an HSRPStateChange trap then

Begin

Composer extracts the IP address of the trap source from the trap;

Composer asks callout if the IP address needs to be processed further or not;

The callout responds with yes or no depending on whether the IP address is locally managed or not (we won't process forwarded HSRP traps that are forwarded from a collection station), and also whether there is a topology object in the NNMET topology for that address in the HSRP topology tables;

Composer asks callout if processing is in progress for the group;

If callout responds with yes, Composer holds the current event to be correlated later under the output event from the current processing that is going on;

If callout responds with no, Composer asks callout for all the members of the HSRP group;

The callout sets the 'status computation in progress' flag for the group in its address space;

The callout responds with a list of NNMObjectIDs;

Composer sends the OV_Force_If_Group_Status_Poll event to Netmon filling in the event with the count of the interfaces and the actual interface NNM object IDs;

Composer starts a 'configured timer' which makes it wait for Netmon to complete the polls, and set status in ovtopmd (this timer is started internally in the Composer via a generated event);

Once the timer expires, Composer asks callout to check if HSRP status and the active, standby interfaces have changed;

The callout a) computes the results depending on the changed conditions using the status calculation algorithm, and also the active standby calculation algorithms described above, b) clears the 'status computation in progress' flag for this HSRP group, and c) responds to Composer with the results;

Composer applies the event generation algorithm to generate appropriate events, and correlates the held events under the generated event.

End

If the event is an OV_IF_*type event then

Begin

Composer checks the Capabilities field in the event to see if it contains isHSRP;

If no, then no further action is taken on this event for this HSRP correlation;

If yes, then Composer asks callout if this interface is to be processed at all;

Callout responds with yes or no depending on whether the interface is local or remote, and also whether the interface belongs to any HSRP group at all;

If the answer is no, no further action is taken by Composer for this correlation;

If the answer is yes, then

Composer asks callout if the group to which this interface belongs is being processed already;

If callout responds with yes, then Composer holds the event to be correlated under the event related to current processing;

If the callout responds with no, then Composer asks callout for the interfaces in the group to be polled other than the one for which an event came;

The callout sets the 'status computation in progress' flag for the group in its address space;

The callout responds with the NNM object Ids of the interfaces asked to be processed;

The remaining steps are same as for HSRP trap processing.

End

With respect to NNMET Topology Reinitialization, while an HSRP status computation and event correlation is in progress, it can so happen that NNMET discovery finds a new topology. Of course NNMET can find a new topology even when no HSRP status computation is in progress. To enable applications to handle this "new topology" condition properly, the NNMET topology service can introduce a new event, that will inform users that a new NNMET topology is available. Composer on receipt of this event stops processing any HSRP correlation, and asks the callout for a reinitialization.

The reinitialization in the callout will clear all HSRP related internal states that the shared library is keeping.

NNMET Topology changes to support this functionality include a field called "IP Level" which can be introduced in the Address table and which can have either 6 or 4 as the value. This is because the same IPv4 (Internet Protocol Version 4) Address can have two different objects in the NNMET topology database, one populated by IPv6 (Internet Protocol Version 6), and the other by IPv4 discovery. If an application wants to search by IPv4 Address, it should indicate its level.

The NNMET topoApi can provide a C++ interface for querying HSRP topology objects, setting the HSRP object status, active, and standby addresses for that group. Details of the API will be available elsewhere.

To support the functionalities described herein, the NNMET discovery process can compute initial statuses of all the HSRP objects that are being inserted, so that the HSRP statuses are persistent across discoveries.

In addition, the following correlators can be used to support the programmatic HSRP status determination described herein.

In the HP OpenView NNM 6.4 release, interface events will be generated by the Netmon process whenever Netmon determines or detects a status change on the interface. This event can be displayed in the alarm browser (for example, the NNM Alarm Browser shown in FIG. 8) as a top level event. Some interfaces are HSRP interfaces, while others are not. Now, whenever an HSRP interface changes its status, the HSRP group will also be impacted, and a corresponding alarm will be generated for the HSRP group in accordance with the exemplary methods and procedures described herein. In order to reduce the alarm overload, in exemplary embodiments and methods a correlator is provided to correlate all interface status change events that are from the interfaces of the HSRP group, under the HSRP group status change event. The correlator can be configured to listen to the interface events and the HSRP status change event.

HSRP state change SNMP traps are emitted by devices on behalf of HSRP interfaces whenever they undergo an HSRP state change (e.g. due to a physical fault, configuration etc.). In exemplary embodiments and methods a correlator is provided to correlate the HSRP state change SNMP trap under the HSRP status change event that is generated or announced. This also reduces an alarm overload on the operator. The correlator can be configured to listen to the HSTP state change SNMP traps and the HSRP status change event.

The NNM extended topology product (NNM ET) can be configured to emit a new Topology event whenever a new topology is created and/or replaces an old topology. In exemplary embodiments and methods a correlator is provided to listen for this event and drop all the outstanding correlations at that point in time. This prevents reporting of erroneous results.

The functionalities described herein, for example the OVWDB, OVTOPMD, Netmon, OVTRAPD, NNM Alarm Browser, and PMD with ECS/Composer shown in FIG. 8, can be implemented via software operating on a computer connected to a network (for example the network shown in FIG. 8) and the HSRP interfaces being monitored, and/or via software agents operating on the network using network resources. The NNMET Topology RDBMS shown in FIG. 8 can be one or more fileservers external to the computer, can be embodied in separate hard disk drives that are internal or external to the computer, can be embodied as different partitions or portions of a single hard disk drive or other data storage device, can distributed among multiple devices, and so forth.

Software packages, elements or modules for variously providing access or views to databases and for gathering and/or processing information as described herein, can be implemented on the computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. Method for monitoring status of a Hot Standby Routing Protocol group of routers, comprising:
   for each network interface of each router in the group, monitoring changes in a status of the network interface;
   based on the monitored changes, determining a status of the group;
   determining a Hot Standby Routing Protocol priority of each of the network interfaces; and
   determining a status of the group based on the monitored changes and the determined priorities.

2. The method of claim 1, wherein possible status states of each network interface of each router in the group comprise critical, normal, and unknown.

3. The method of claim 1, wherein a change in the status of the network interface is indicated in a state transition trap.

4. The method of claim 1, wherein a change in the status of the network interface is indicated in a change event generated by a system monitoring the group of routers.

5. The method of claim 1, wherein a change in the status of the network interface is included in a reply to a status poll to the network interface.

6. The method of claim 1, comprising displaying the determined group status.

7. The method of claim 1, comprising determining which interface is an active interface.

8. The method of claim 7, comprising determining which interface is a standby interface.

9. A method for monitoring status of a Hot Standby Routing Protocol group of routers, comprising:
- receiving an object identification of a router interface which has undergone a status change;
- receiving a Hot Standby Routing Protocol object in the event the router interface belongs to a Hot Standby Routing Protocol group;
- determining all other interfaces of routers in the Hot Standby Routing Protocol group;
- polling determined router interfaces to determine a status and Hot Standby Routing Protocol priority of each interface;
- determining an active interface based on the polling; and
- estimating status of the Hot Standby Routing Protocol group based on the determined status and Hot Standby Routing Protocol priority of the router interfaces.

10. A method for monitoring status of a Hot Standby Routing Protocol group of routers, comprising:
- detecting a state transition of an interface;
- determining whether the interface belongs to a Hot Standby Routing Protocol group;
- based on the determining, identifying all Hot Standby Routing Protocol interfaces for the Hot Standby Routing Group to which the interface belongs;
- polling the identified interfaces for status information; and
- determining Hot Standby Routing Protocol group status and active and standby interfaces based on the polling.

11. The method of claim 10, comprising generating a Hot Standby Routing Protocol group alarm and correlating symptom alarms.

12. The method of claim 11, comprising displaying the Hot Standby routing Protocol group status.

13. A system for monitoring status of a Hot Standby Routing Protocol group of routers, comprising:
- means for monitoring changes in a status of each network interface of each router in the group and determining a status of the group based on the monitored changes;
- means for determining a Hot Standby Routing Protocol priority of each of the network interfaces; and
- means for determining a status of the group based on the monitored changes and the determined priorities; and
- means for displaying the determined status.

14. The system of claim 13, wherein the means for monitoring and determining determines a Hot Standby Routing Protocol priority of each of the network interfaces.

15. A non-transitory computer readable medium encoded with a computer program that when executed by a computer causes the computer to perform:
- for each network interface of each router in the group, monitoring changes in a status of the network interface;
- based on the monitored changes, determining a status of the group;
- determining a Hot Standby Routing Protocol priority of each of the network interfaces; and
- determining a status of the group based on the monitored changes and the determined priorities.

16. The non-transitory computer readable medium of claim 15, wherein the computer program that when executed by a computer causes the computer to perform:
- displaying the determined group status.

17. A non-transitory computer readable medium encoded with a computer program that when executed by a computer causes the computer to perform:
- receiving an object identification of a router interface which has undergone a status change;
- receiving a Hot Standby Routing Protocol object in the event the router interface belongs to a Hot Standby Routing Protocol group;
- determining all other interfaces of routers in the Hot Standby Routing Protocol group;
- polling determined router interfaces to determine a status and Hot Standby Routing Protocol priority of each interface;
- determining an active interface based on the polling; and
- estimating status of the Hot Standby Routing Protocol group based on the determined status and Hot Standby Routing Protocol priority of the router interfaces.

18. A non-transitory computer readable medium encoded with a computer program that when executed by a computer causes the computer to perform:
- detecting a state transition of an interface;
- determining whether the interface belongs to a Hot Standby Routing Protocol group;
- based on the determining, identifying all Hot Stand by Routing Protocol interfaces for the Hot Standby Routing Group to which the interface belongs;
- polling the identified interfaces for status information; and
- determining Hot Standby Routing Protocol group status and active and standby interfaces based on the polling.

19. The non-transitory computer readable medium of claim 18, wherein the computer program that when executed by a computer causes the computer to perform:
- generating a Hot Standby Routing Protocol group alarm and correlating symptom alarms; and
- displaying the Hot Standby routing Protocol group status.

* * * * *

UNITED STATES PATENT AND TRADEMARK OFFICE
CERTIFICATE OF CORRECTION

PATENT NO. : 8,213,439 B2
APPLICATION NO. : 11/023409
DATED : July 3, 2012
INVENTOR(S) : Srikanth Natarajan It is certified that error appears in the above-identified patent and that said Letters Patent is hereby corrected as shown below:

In column 14, lines 49-50, in Claim 1, below "interface;" delete "based on the monitored changes, determining a status of the group;".

In column 15, lines 42-43, in Claim 13, delete "group and determining a status of the group based on the monitored changes;" and insert -- group; --, therefor.

In column 16, lines 6-7, in Claim 15, below "interface;" delete "based on the monitored changes, determining a status of the group;".

Signed and Sealed this
Fifth Day of February, 2013

Teresa Stanek Rea
*Acting Director of the United States Patent and Trademark Office*